United States Patent [19]
Waterman

[11] Patent Number: 6,064,426
[45] Date of Patent: May 16, 2000

[54] VIDEO MAGNIFICATION SYSTEM

[76] Inventor: Linden K. Waterman, 1215 W. Linden, Caldwell, Id. 83605

[21] Appl. No.: 09/118,328

[22] Filed: Jul. 17, 1998

Related U.S. Application Data

[60] Provisional application No. 60/053,143, Jul. 18, 1997.

[51] Int. Cl.⁷ .................................................. H04N 7/18
[52] U.S. Cl. ............................................. 348/63; 362/413
[58] Field of Search ..................................... 348/373, 375, 348/63; 248/917, 918, 919, 920, 921, 922, 923, 924, 280.11, 281.11; 294/139; 354/81; 362/413, 402, 418, 419, 427

[56] References Cited

U.S. PATENT DOCUMENTS

| | | | |
|---|---|---|---|
| 3,891,842 | 6/1975 | Strusinski | 240/1.4 |
| 4,963,903 | 10/1990 | Cane | 354/81 |
| 4,987,690 | 1/1991 | Asldenberg | 40/341 |
| 5,477,283 | 12/1995 | Casey | 353/62 |
| 5,835,266 | 11/1998 | Kitajima | 359/384 |
| 5,856,874 | 1/1999 | Tachibanna | 356/376 |

OTHER PUBLICATIONS

LS&S Group Catalog, 1997–1998, pp. 36–38 (present invention on p. 38).
Visionics Brochure, 1996, pp. 1–8.
Aladdin® Personal Reader Brochure.
Ken–a–vision® Brochure.
HumanWare, Inc. Catalog, pp. 6–14.

*Primary Examiner*—Vu Le
*Assistant Examiner*—Luanne P. Din
*Attorney, Agent, or Firm*—Ken J. Pedersen; Barbara S. Pedersen

[57] ABSTRACT

Embodiments of a vision aid video magnification system for low-vision persons are shown and described. The system includes a balanced arm with a first portion that swivels on a base, a second portion connected to the enclosed camera, and an elbow between the first and second portions. The elbow includes a sliding spring fulcrum which enhances the smooth movement of the second arm portion and camera. The first arm portion includes an inner spring between arm tubes that helps eliminate the dead area that may be otherwise present in balanced arms. Other improvements include a flexible camera mount that preferably swivels relative to the arm, and a mirror attachment for personal care and other use. The vision aid video magnification system allows enhanced, smooth movement and versatility.

8 Claims, 4 Drawing Sheets

VIDEO MAGNIFICATION SYSTEM

DESCRIPTION

This application is a conversion of, and claims priority from, a prior co-pending provisional application Ser. No. 60/053,143, filed Jul. 18, 1997 and entitled "Video Magnification System," which application is herein incorporated by reference.

BACKGROUND OF THE INVENTION

FIELD OF THE INVENTION

The invention relates to closed circuit television (CCTV) systems for persons with low vision. More specifically, the invention relates to a flexible, moveable, articulated arm which may be incorporated in a CCTV or other vision aid.

SUMMARY OF THE INVENTION

The invented video magnification system is a CCTV system which is produced as a visual aid for persons with low vision. The system comprises three primary components: 1) a video camera, 2) a camera enclosure, with a spring balanced arm, and 3) a video television monitor. Components 1 (video camera) and 3 (video monitor) may be conventional units produced by manufacturers in the marketplace today. The present invention comprises improvements in the balanced arm, and the novel combination of components 1–3 assembled into an end-user system.

The design goal for the arm was to produce a mounting device for a camera that would meet the needs of those with low vision. Most people in this group are elderly. To this end, the arm's features provide: 1) that it hold the camera in nearly any position, 2) that it be very easy to move the camera head, 3) that there be a minimum of movement backlash, 4) that the mount be stable, 5) that the overall effect of the first four characteristics result in a camera mounting mechanism that is very intuitive and easy to learn to use, and 6) that the design makes it useful for reading material, but that its added flexibility makes it useful for a whole range of tasks for which conventional CCTVs are not suitable. Included with this application is Table 1, infra, listing common uses of this device, with asterisks marking uses for which this device is well suited which conventional CCTVs are not. In short, the design aim of this product is to allow people with low vision to perform a range of visual tasks sufficient for them to retain or regain self dependence.

The invention incorporates several design innovations which result in a movement which is smoother, more stable, more variable, requires less force, and produces less backlash than other arms.

A first innovation of this invention is the configuration of a low vision appliance which places a camera on the end of a "flexible", articulated arm so that users may easily position it over material that they want to see and so that users may easily view a magnified image on the monitor. Also, the camera is self-focusing, which makes it far easier for visually impaired persons to use.

A second innovation of this design is the variable sliding spring fulcrum found at the arm's elbow. This variable fulcrum allows a nearly constant tension to be exerted on the forward portion of the arm throughout its movement, permitting the camera head to stay in nearly any position while retaining the property of easy movement. In contrast, conventional fixed-spring fulcrum designs of swing-arm lamps, for example, have only a single point where the supported mass is balanced. This design flaw of conventional swing-arms is generally overcome by tightening wing-nut style fasteners at the joints of the arm, which have the triple disadvantages of: (1) making the arm much harder to move; (2) increasing backlash wherein the arm must be moved beyond its desired position in order to come to rest at the desired spot; and, (3) limiting range. Although the wing-nut style fasteners do increase the range where the end of a swing-arm may be held, the range is still limited to less than the full sweep of the arm. On the other hand, the effectiveness of the invented variable sliding spring fulcrum mechanism may be demonstrated by loosening the fasteners at the joints of the invented arm and noting that it will stay in nearly any position without friction from the fasteners. Prior to shipping of the invented device, fasteners at the joints are slightly tightened, but this is primarily because slightly tight fasteners provide a more stable image—not because the friction is necessary to hold the camera in place.

A third innovation is the addition of a small compression spring mounted between the upper and lower proximal arm tubes, preferably on the top of the distal end of the lower primary arm tube. Swing arms without this spring have a "dead" area, or "hole," that they "fall" into as the head of the device is pushed close to the base. After they have fallen into this position, it takes significantly more force to move the head away from the base than to move it in other areas within its reach. The addition of the proper compression spring in this position eliminates this "hole" so completely that users do not sense any weak area of travel.

A fourth innovation is the swivel camera head mount. This swivel allows the camera head to swivel horizontally from side to side—approximately 270°. This advantage becomes more apparent upon using the device. In order for the orientation of viewed material to appear correctly on the screen, the camera head must always remain square with the viewed material, with the top of the material oriented to the back of the camera. The swivel mount allows the camera head to be placed almost anywhere within its range and yet easily retain this orientation.

A fifth innovation is that the actual camera head is mounted on a flexible gooseneck. This allows for final fine adjustment of the camera angle. Whereas most reading material is placed on a flat desk and needs to have the camera head parallel to the desk, many hand tasks are performed more easily if the camera head can be tipped at an angle. This gooseneck arrangement allows complete flexibility to match the viewing angle to the task.

A mirror attachment is preferably supplied with the camera which is held by means of a hook and loop fastener, or other easily removable and replaceable means. This permits the invention to be used as a personal care viewer, i.e., for shaving, applying makeup, etc. One might note that the camera head could simply be tipped up because of the flexible shaft mount. However, this yields an inverted image on the screen. Even if it yielded an upright image on the screen, it would be a true image and not a mirror image. This might seem an advantage in theory, however, because people have used mirrors all their lives, a mirror image on-screen is much more intuitive than a true image. With a true image, as your right hand enters the field of view from the right, moving from right to left, it will appear first on the left-hand side of the screen and appear to be moving from left to right—accurate, but not intuitive.

Throughout, the invented arm is made of atypically strong materials. Its strength and extra weight contribute to making it very stable.

In summary, the invented arm has been designed so that its movement is so glassy smooth and easy to move to any position over a text or other material that it almost feels as though it has some form of electromechanical assist device. This ease of movement and flexibility combine to make a superior low vision aid that can help keep those with low vision independent.

BRIEF DESCRIPTION OF THE PHOTOS AND DRAWINGS

DESCRIPTION OF THE PREFERRED EMBODIMENT

Figure 1:
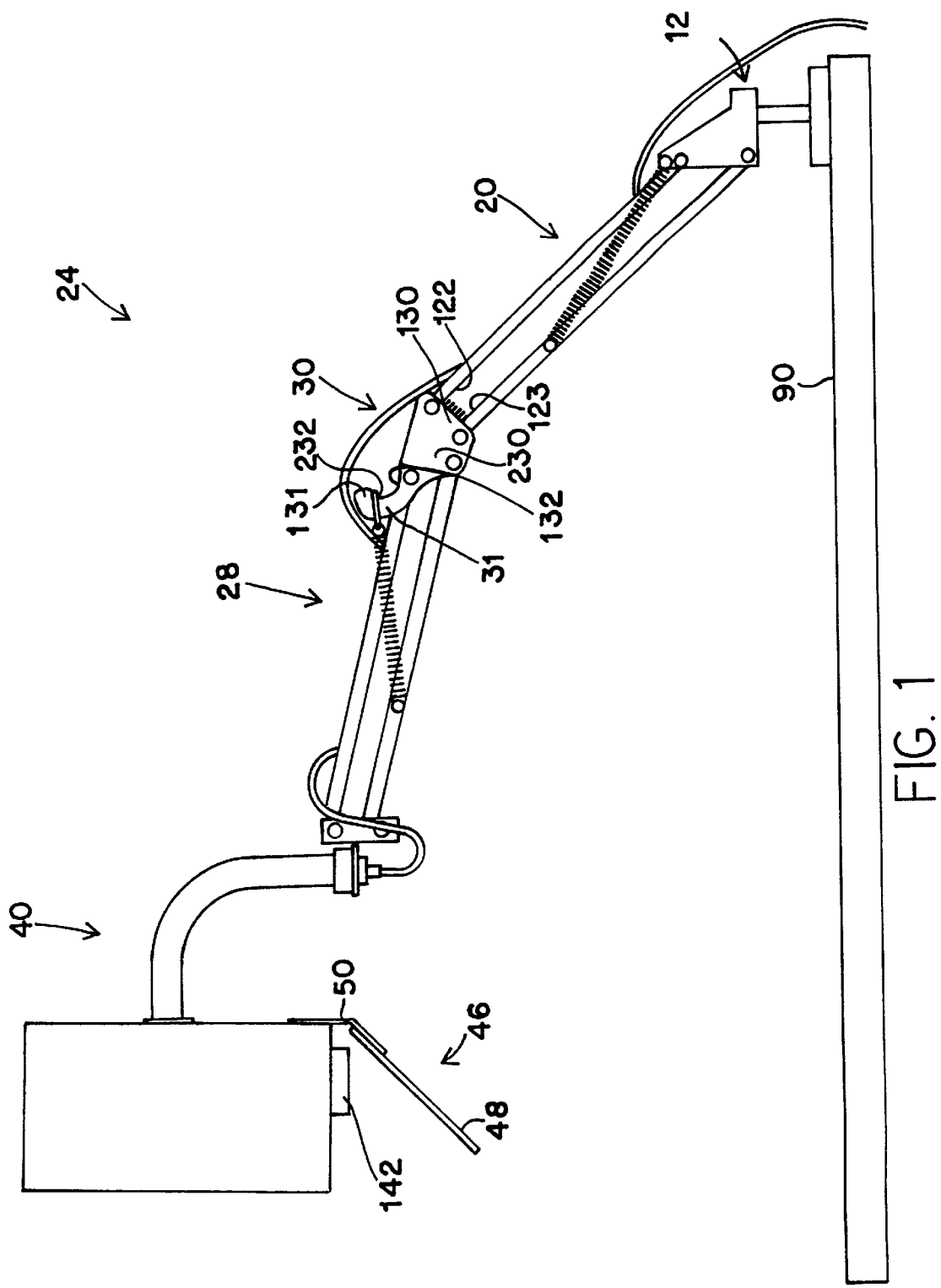
FIG. 1 and FIG. 2 are side perspective detail views of the preferred embodiment of the invented vision aid system, with FIG. 1 showing the vision aid system in an upwardly-extended position with a mirror attachment, and FIG. 2 showing the system in a downward position without the mirror attachment.
Figure 2:
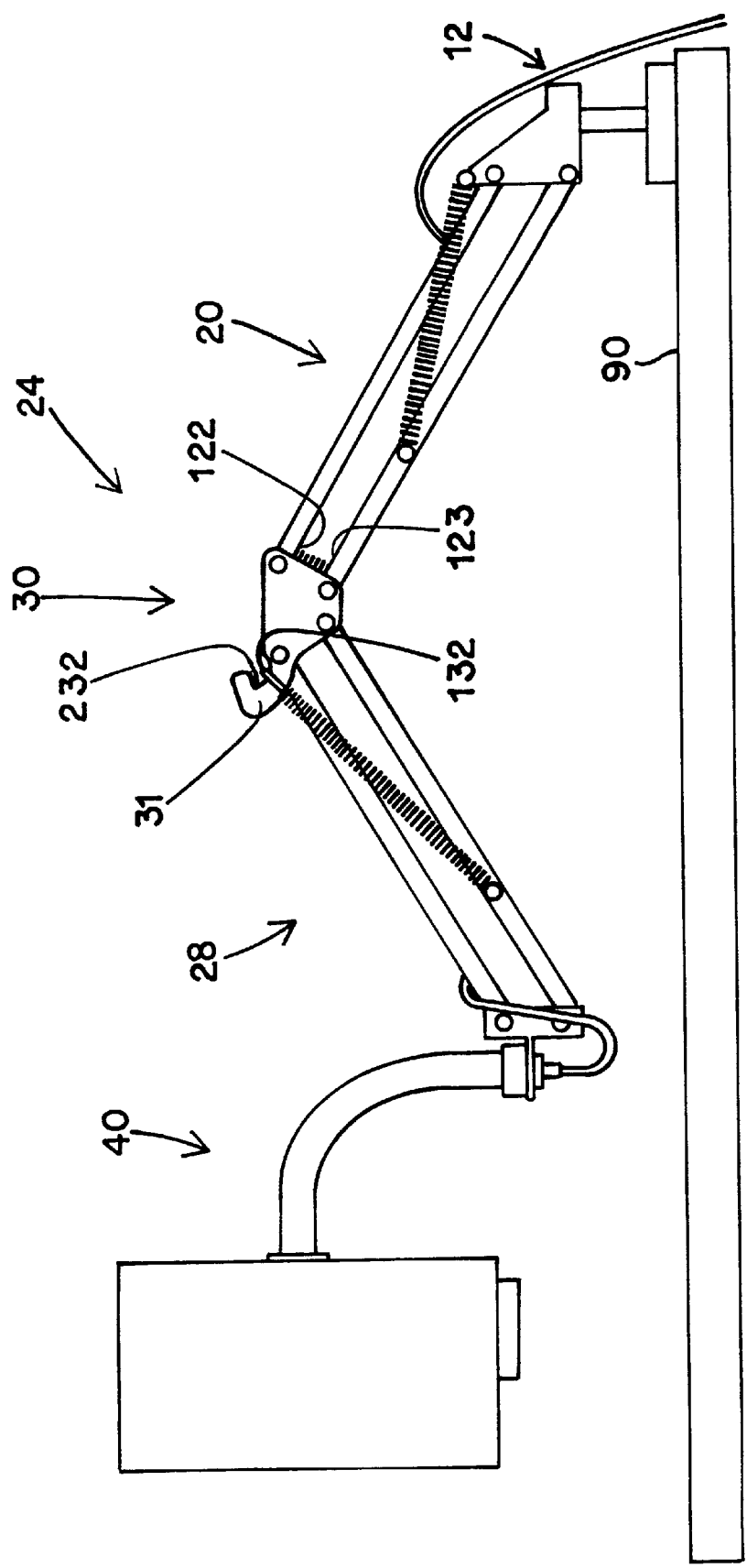

Referring to the enclosed figures, there is shown a preferred, but not the only, embodiment of the invented vision aid system 10, as shown in FIG. 1 and FIG. 2. In this description, "proximal" means "closest to the arm base," and "distal" means "farthest from the arm base."

Figure 3:
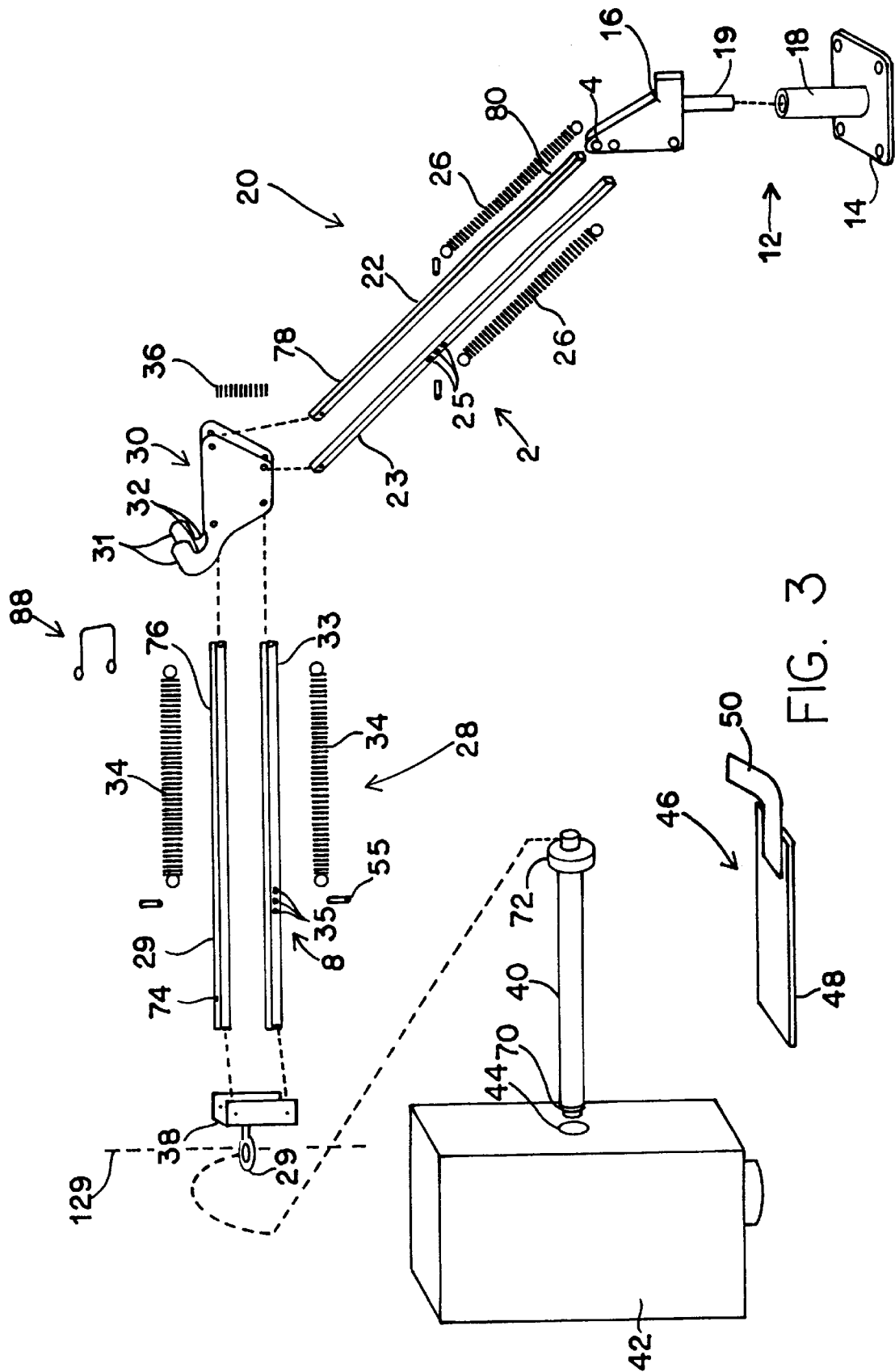
FIG. 3 is an exploded, side perspective detail view of the preferred embodiment of the invented vision aid system of FIG. 1.

As illustrated in FIG. 1 and FIG. 2, the preferred embodiment of the invented vision aid system 10 is made up of: an arm base assembly 12, a proximal arm assembly 20, a distal arm assembly 28, an elbow mounting bracket 30, a camera mounting bracket 38, and a camera enclosure body 42. The arm base assembly 12 is made up of the bottom base assembly 14, or "base stand" 14 and a top base assembly or "winged base swivel" 16, as shown in FIG. 3.

The following description includes specific dimensions and shapes of the pieces parts of the preferred embodiment. Many alternative dimensions and shapes may be used within the scope of the invention.

Base Stand

The preferred base stand 14 may be made of a piece of ⅛-inch plate soft steel, 3 inches square. The edges and corners are preferably rounded so they are not sharp. One 3/16-inch mounting hole is placed in each of the four corners, each 0.5-inch from each edge. These holes are beveled so a tapered screw will sit down flat in each hole.

A 1.875-inch long nipple 18 made of standard soft ⅜-inch water pipe, whose center has been drilled to 0.5-inch, is welded or otherwise affixed at right angles to the plate, centered on an offset point 1.5 inches from the side and 2 inches from the front. The base stand 14 may be screwed or clamped to the table edge or any firm, rigid surface 90. This offset mounting leaves more room for the clamp (not shown) contact point. The base stand 14 may be fastened to the flat surface 90 using four, 1-inch by number 8, screws, or by a standard 3-inch carpenter's C-clamp, for example.

As may be envisioned by one skilled in the art, other base stands may be designed, as long as they rotatably receive or connect to the articulated arm of the invention. The invention is typically installed on a flat, horizontal surface, but may be installed on other surfaces with appropriate adaption of the base stand.

Winged Base Swivel

The winged base swivel 16 is the preferred mounting bracket that rotatably connects the proximal arm assembly 20 to the base stand 14. Its design allows the invented arm 24 to swivel 360° around the vertical axle formed by tube 19. The base swivel 16 allows the proximal arm tubes 22, 23 to pivot in a generally vertical plane, when the base stand 14 is on a horizontal surface, approximately 140° around their pivot points. The swivel 16 also acts as a proximal mount for the proximal suspension springs 26.

The winged base swivel 16 may be made of ⅛-inch soft plate steel cut from a single piece and folded around a cylindrical steel pin about 2.8 inches long with a diameter of 0.5-inch, and welded or otherwise affixed together, resulting in bottom tube 19 extending downward from the swivel 16. The bottom tube 19 of the winged base swivel 16 rotatably slides into the nipple 18 and is preferably long enough to anchor the invented arm 24 in to nipple 18 of the base stand 14 without further attachment. Additionally, the long tube 19 minimizes the effect of any play which may come about as a result of the nipple 18 and the tube 19 being manufactured to the opposite extremes of their tolerances, that is, the tube to its maximum size, the nipple to its minimum size, which would result in some looseness. The proximal arm tubes 22, 23 pivotally connect to the winged base swivel 16 at two spaced points in between the wings. The winged base swivel 16 has lower proximal spring mounts 4 for attachment of the proximal suspension springs 26 on both sides of the arm tubes 22, 23 to the outer corners of the wings. Thus, the arm tube connection points and the suspension spring connection points are in triangular arrangement.

Proximal Arm Assembly

The proximal arm assembly 20 is made up of an upper proximal arm tube 22 and a lower proximal arm tube 23. These preferred proximal arm tubes 22, 23 may be made of stock square 0.5-inch tube with a 0.065-inch wall thickness, and each has an overall length of 15 inches. The upper proximal arm tube 22 has a proximal perforation 78 and a distal perforation 80 on the top surface to allow a signal cable to pass through. The lower proximal arm tube 23 has a upper proximal spring mount 2 made of three mounting holes 25 on the side which hold the mounting bolt 55 which secures the distal mounting for the proximal suspension springs 26. The proximal end of the proximal suspension springs 26 attach to the lower proximal spring mount 4. The three mounting holes 25 are used to allow some adjustment for variances in spring tension.

An inner compression spring 36 is placed between the two proximal arm tubes 22, 23, preferably attached on the upper surface of the distal end of the lower proximal arm tube 29. Thus, the inner compression spring rests between the upper surface of the proximal end of the lower distal arm tube 29 and the bottom surface of the proximal end of the lower distal arm tube 29 and is adapted to apply pressure outward against the tubes when the arm pivots to place the arm 28 close to the arm 20 and the arm tubes 22, 23 are brought together.

Distal Arm Assembly

The distal arm assembly 28 is made up of an upper distal arm tube 29 and a lower distal arm tube 33. These tubes may be made of stock square 0.5-inch tube with a 0.065-inch wall thickness, and each may have an overall length of 17 inches. The upper distal arm tube 29 has a proximal perforation 74 and a distal perforation 76 on the top surface to allow a signal cable to pass through. The lower distal arm tube 33 has an upper distal spring mount 8 having three mounting holes 35 on the side which hold the mounting bolts 55 which secure the distal mounting for the distal support springs 34. Three mounting holes 35 are left to allow some adjustment for variances in spring tension.

Elbow Mounting Bracket

The elbow mounting bracket 30 is approximately in the middle of the arm 24 and is adapted to connect the proximal arm assembly 20 to the distal arm assembly 28 by providing pivotal connection points, at a first end 130 of bracket 30, for each of the two proximal arm tubes 22, 23, at a central area 230 of bracket 30, and the distal arm tubes 29, 33. The bracket 30 may comprise two parallel plates which may be made from ⅛-inch soft steel plate, or other preferably very strong and rigid material. Each of the two plates has an elbow extension 31, which each serve as a variable "sliding spring fulcrum". On the top distal surfaces of the two elbow extensions are curved surfaces 32, which act as sliding surfaces for a wire bracket 88 which acts as the lower distal spring mount 6 for the distal support springs 34. This gives the distal support springs 34 a unique variable fulcrum, which is largely responsible for the ability of the arm to move smoothly and easily, and yet hold the camera head in nearly any vertical position with almost no backlash, and without overtightening the arm fasteners. As illustrated in FIGS. 1 and 2, the spring 34 slides along the curved surfaces 32 between the inner end 132 and the outer end 232, with the outer end 232 being near protrusion 131. The other end of the distal support springs 34 is attached to the distal arm tube 29, 33. Optionally, one plate and its extension may be used for a single spring 34, but the preferred elbow bracket comprises two plates, each with a curved surface 32 holding a spring 34.

Inner Compression Spring

The invented system is designed to let the user easily move the viewing head close to the base. This makes it practical to use in tight quarters, which elderly users sometimes require. A special adaptation was necessary to make this possible. A 0.031-inch by ⅜-inch by 0.56-inch inner compression spring 36 is mounted, through use of a sheet metal screw and a washer, 0.359 inches back from the distal end of the lower proximal arm tube 23, on the upper surface 123 of the distal end of the lower proximal arm tube 23. The inner compression spring 36 extends toward, but is not attached to, the bottom surface 122 of the upper proximal arm tube 22. The inner compression spring 36 contacts and slides along the bottom surface of the upper proximal arm tube 22, and may be somewhat compressed when the proximal arm tubes 22, 23 are within, or less than, about 20° from vertical, that is within or less than about 20° from perpendicular to the table surface.

This innovation solves the following problem: when the proximal arm assembly 20 is perpendicular to the table surface, the lower proximal spring mounts 4 are the closest to the upper proximal spring mounts 2. This means that the proximal suspension springs 26 start to exert more tension as the proximal arm assembly 20 moves either direction from this position. When the invented arm 24 moves forward, the spring tension helps support the weight of the camera head 42 and the invented arm 24. However, when the invented arm 24 is moved backwards (slightly beyond perpendicular), this tension creates a "hole" into which the invented arm 24 falls. In other words, it creates an area around the arm base assembly 12 that extends in an approximately 15-inch radius where it is very difficult to pull the invented arm 24 forward—because the proximal support springs 26 are pulling against the user. In the present invention, this small inner compression spring 36, mounted on the upper surface of the lower proximal arm tube 23, almost completely eliminates this "hole". This is done because the small inner compression spring 36, being mounted on the upper surface of the lower proximal arm tube 23, thereby offsets the pull of the proximal suspension springs 26, giving the invented arm 24 a uniquely smooth movement when it is being used close to the arm base assembly 12.

Camera Mounting Bracket

The camera mounting bracket 38 is preferably made of 0.065-inch soft steel. The proximal part of the assembly is folded into an U-shape, and has mounting holes for the distal arm assembly 28. A 0.065-inch wall thickness square tube, extending generally perpendicularly from the U-shape, or other protrusion 29 is welded, or otherwise affixed, to the front of the camera mounting bracket assembly. It has a 0.39-inch hole drilled vertically through the top and bottom, into which the proximal end nipple 72 of the flexible gooseneck tube 40 is mounted Preferably, the mounting bracket 38 stays level, with its protrusion 29 held horizontal throughout the motion of the arm. The gooseneck tube 40 is inserted through the vertical hole in the protrusion 29 which allows the camera on the gooseneck to be held level (parallel to the table surface and parallel to the protrusion 29) throughout the motion of the invented arm 24. The gooseneck is flexible enough to be moved only when the user purposely grasps it and twists or turns it, but during normal use, the gooseneck stays in the shape pre-formed by the user. By remaining level, the camera head 42 can be adjusted so that it has a very easy pivot motion, and yet will not flop to the side as it is raised or lowered. The camera mounting bracket 38 rotatably receives the proximal end nipple 72, which acts as a generally vertical axis 129 and allows the gooseneck tube 40 to rotate in a horizontal 270° angle.

Gooseneck Tube

The final mounting member is preferably a flexible tube 40, or "gooseneck", whose overall length is 8.125 inches, including pressed holding brackets on the ends, and an actual flexible portion of 5.25 inches. It has a 1.25-inch by 0.375-inch diameter nipple on the proximal end 72, which is inserted in the 0.39-inch vertical holes in the camera mount subassembly. It has a 0.375-inch by 0.375-inch diameter nipple on the distal end 70 which is inserted into the camera enclosure body 42. The whole flexible tube 40 is inserted into a flexible vinyl 7 inches long by 0.75-inch diameter electrical conduit sheath, whose purpose is practical as well as cosmetic in that it covers the light lubricant on the flexible tube.

Camera Enclosure Body

The camera enclosure body 42 may be a painted aluminum box with measurements of 8 inches high, 4 inches deep, and 3 inches wide. The metal thickness is preferably 0.04 inches. The box preferably comprises of two pieces which slide together. Fender washers preferably 0.375-inch in diameter may be used on both the inside and the outside of the box at the flexible arm connection point in order to greatly add to the strength of the connection. The camera enclosure body 42 is sealed with ⅛-inch aluminum rivets. This riveting is to discourage end users from opening the system, which would void the included warranty.

One-inch wide adhesive-backed Velcro® or other hook and loop material is preferably attached along the bottom back camera surface, and around the back, bottom edge. This serves as an attachment point for the mirror 48, as described below.

Camera

The camera is located inside the camera enclosure body 42, with camera lense 142 shown on FIG. 1. A camera assembly which renders in color, focuses automatically, has automatic aperture adjustment, and works well in low light is preferred.

Description of Cables, Connectors, Switch and Light

Three cables are used to connect power to and receive signals from the camera. The first cable is connected to the camera, is threaded first through the camera enclosure body 42, then threaded through the gooseneck tube insertion hole 44, then threaded through the distal end nipple 70, then threaded through the gooseneck tube 40, then threaded through the proximal end nipple 72, then threaded through the proximal perforation 74 and into the upper distal arm tube 29, then threaded out of the upper distal arm tube 29 through the distal perforation 76, then threaded across the upper surface of the elbow mounting bracket 30, then threaded into the upper proximal arm tube 22 through the proximal perforation 78, then threaded out of the upper proximal arm tube 22 through the distal perforation (proximal cable exit hole) 80. This is preferably 1CSA type PCC FT1 cable with three 24 gauge conductors plus ground. At all points which the cable is threaded into or out of an arm, the cable is protected with ⅜-inch heat shrink tubing. This cable is 54 inches long.

At the proximal cable exit hole 80, the PCC FT1 cable is spliced to two other cables. The first is a 66-inch 22 gauge power cord with a molded ⅛-inch coaxial plug. The second is called a signal cable. The signal cable is 10 feet long, and is a coaxial video cable with a molded RCA plug. The splice is covered with ⅜-inch heat-shrink tubing.

A single rocker switch is used to turn power on and off to the system. This single pull, single throw switch is rated 6 amps at 125 volts—a capacity well beyond the 6 volt, 1 amp requirement of the camera. This switch is supplied by the distributor Tech America, and is their part number 910-0976.

A lamp holder/lamp assembly is used to show the user that the camera is turned on—even if the monitor is turned off. This switch is a Tech America part number 900-1940. A 12 volt bayonet base lamp is used (number 1815), both to increase the lamp life, and to provide a dimmer, less intrusive indicator of the power-on state.

Description of Springs

Proximal suspension springs 26 used in the proximal arm assembly 20 are preferably two 0.0475-inch by ⅜-inch by 5-¼-inch suspension springs.

Inner compression spring 36 used in the proximal arm assembly 20 are preferably 0.031-inch by ⅜-inch by 0.56-inch compression spring. Preferably, a single spring is used, but alternative embodiments may include a plurality of springs, or different apparatus for applying a compensating pressure to the tubes in an outward transverse direction.

Distal suspension springs 34 used by the distal arm assembly 28 are preferably two 0.0625-inch by %16-inch by 4-⅜-inch suspension springs.

Alternatively, only one proximal suspension spring and one distal suspension spring may be required on one side of the arm, but two are preferred.

Mirror Attachment

The optional mirror attachment 46, as shown in FIG. 1, preferably comprises a 2.875-inch by 3.5-inch by 0.125-inch thick mirror 48 attached to a holder 50 with cyanoacrylate glue. The holder 50 may be made of 0.125-inch anodized aluminum 1-inch wide and 4-inches long, with two bends. The first is a 90° bend located 1-inch from the end, and the second bend is located two inches from the same end. This bend is in the opposite direction of the first, at an angle of 50°. Adhesive-backed hook and loop fastener, such as Velcro®, is attached inside the 1-inch surfaces of the bends to cooperate with the hook and loop fastener on the camera enclosure body. The back of the assembly is then painted black.

Arm Fasteners

The proximal end of the proximal arm assembly 20 is attached to the winged base swivel 16 through the use of fasteners. The distal end of the proximal arm assembly 20 and the proximal end of the distal arm assembly 28 are attached to the elbow mounting bracket 30 through the use of fasteners. The distal end of the distal arm assembly 28 is attached to the camera mounting bracket 38 through the use of fasteners. The preferred fasteners are stainless steel machine screws, which are not normally adjusted during use.

Use of the Invented Vision Aid System

Figure 4:
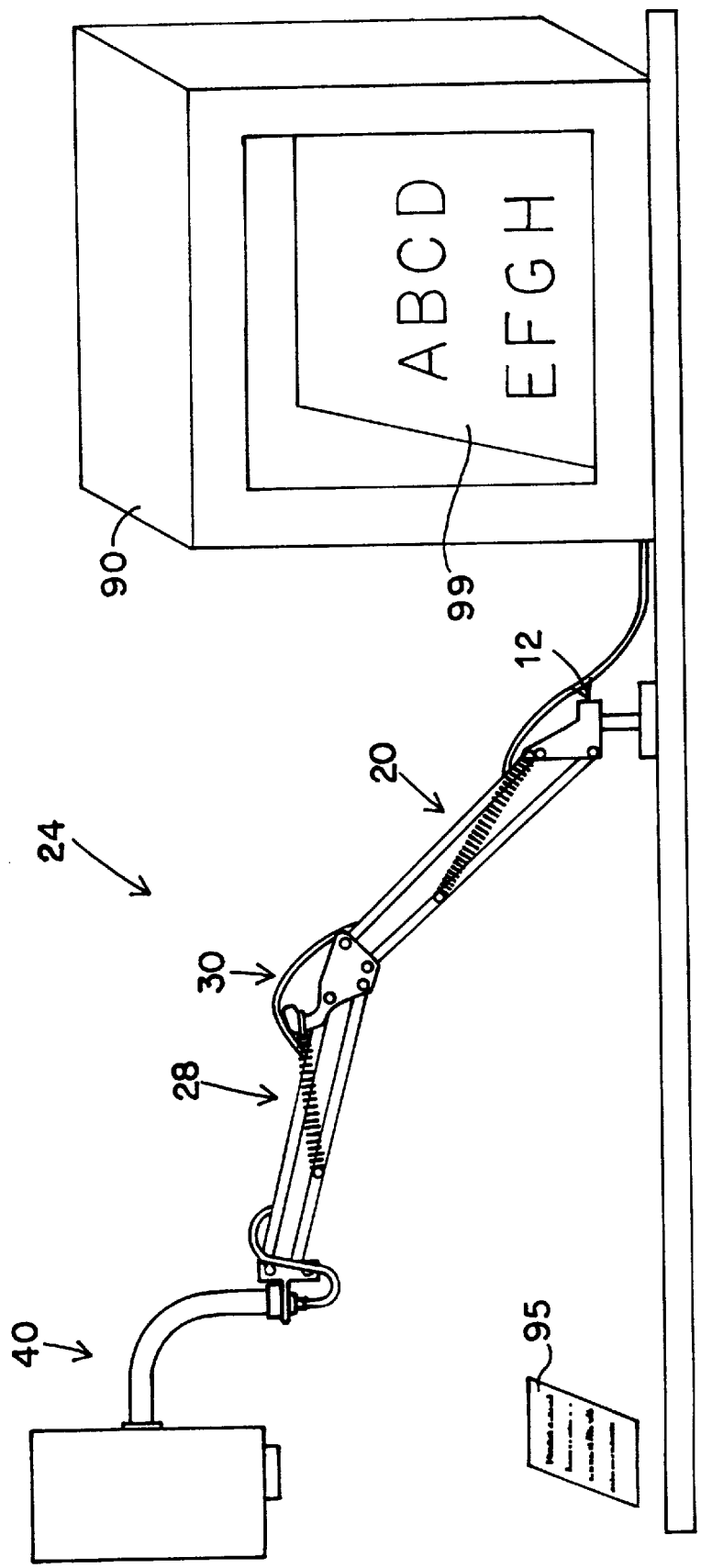
FIG. 4 is a schematic side view of the embodiment of FIG. 1, including a monitor and notation showing the five preferred areas of movement.

As shown in FIG. 4, the invented articulated arm and low vision aid system may be used with ease to view, on a closely-adjacent monitor 90, a magnified image 99 of the text or other surface 95 being viewed Preferably, manual switching of only one on-off switch, located on the camera, and manual movement of the camera head by one hand, is all that is needed for operation. With the invented design, the camera enclosure body may be grasped in the user's hand and maneuvered everywhere over a text or other material to be magnified on the monitor, without skipping, binding, dead spots or other difficulty. The articulated arm has a wide and generally continuous range of motion due to the articulated arm with its spring-balanced design, the camera mount swivel, the winged base swivel, and the gooseneck. The articulated arm has two main portions, the proximal arm assembly and the distal arm assembly, which pivot at the elbow joint between them in a plane preferably perpendicular to the surface upon which the arm base is secured, and preferably perpendicular to the surface of the text. More specifically, this is accomplished by several combined factors: the approximate 360° horizontal swivel of the base assembly, approximately 270° horizontal swivel of the camera, the twistable, bendable gooseneck, and the articulation of the arm at the elbow that allows a range of movement between a position closely adjacent to the base and fully extended out to its full length. As shown in FIG. 4, the arm is moveable in at least five places: it swivels (A) and pivots (B) near at its base ("shoulder"), it pivots at its middle (C, "elbow"), it swivels at its distal end (D, "wrist") and it flexes in substantially all directions at the gooseneck (E, "hand"). Preferably, no electro-mechanical means is used to move the arm, that is, no mechanized pullery, solenoids, levers, etc., are needed in the articulated arm and no motor is needed for moving the arm. Preferably, no arm joint locks are needed during use of the arm.

TABLE 1

Uses for the invented vision aid system

Below is a partial list of the way the system may be used. Asterisks denote uses not generally possible with a conventional, fixed mount CCTV system.

Common reading reading contracts reading prescription reading mail reading the newspaper/magazines reading legal/insurance/investment documents reading recipes Viewing pictures Color rendering makes it especially enjoyable for this purpose Writing The variable mount makes writing much easier than on a fixed mount system, because the viewing head can be placed on the area of a desk where you naturally write.

checks letters to friends and relatives business, civic, and church correspondence

*Typewriter

For those who still use a typewriter, the variable head may be positioned so that typing can be viewed while it is still on the machine.

*Personal Care

*clipping fingernails and toenails

*skin inspection for wounds or disease

*applying makeup

*shaving/beard trimming

*removing slivers

*removing foreign objects from eye, ear, teeth

Hobbies

*knitting/crocheting

*modeling

*limited woodworking (may require special setup, should use optional camera guard)

coin/stamp inspection

*limited electronics work/soldering (should use optional camera guard)

*painting/art work—the viewing head may be situated to view an easel aid in gardening—reading seed packets and identifying plants, as well as pests and plant diseases
*Device repair (within ability of user)
  *replacing device batteries (i.e. hearing aid, bathroom scales, smoke alarm)
Aid for computer work
  Especially helpful with adapter that allows of the invention's video screen to be used as a computer monitor, with a switch to alternate between the two
    Reading/inspecting CD's and Diskettes
    *Can view inside of computer for installing upgrades, inspecting components
Maintenance of organization affiliations
  Ability to review material and respond appropriately to correspondence from organizations, including those that help maintain independent living
*Reading music
  Mounting makes it possible to read music while playing a keyboard, string, brass, or woodwind instrument
Contenting Education
*Playing games
  *card games
  *chess/checkers
  *board games Although this invention has been described above with reference to particular means, materials and embodiments, it is to be understood that the invention is not limited to these disclosed particulars, but extends instead to all equivalents within the scope of the following claims.

I claim:

1. A vision aid system comprising an articulated arm, a camera, and a camera mount assembly connecting said camera to the articulated arm, the articulated arm comprising:

a proximal arm assembly having a first end and second end, said first end for connection to a surface;

a distal arm assembly having a first end and a second end;

an elbow mounting bracket pivotally connecting said first end of the distal arm assembly to said second end of the proximal arm assembly, the elbow mounting bracket having an elongated distal surface having an inner end and an outer end, wherein the inner end is nearer the distal arm assembly than is the outer end;

wherein the articulated arm bends at the elbow mounting bracket to swing the distal arm assembly to a first position close beside the proximal arm assembly and to swing the distal arm assembly to a second position extending outward from and generally parallel to the proximal arm assembly; and a support spring having a distal end attached to the distal arm assembly and having a proximal end attached to the elbow mounting bracket;

wherein said support spring proximal end is slidably attached to the elbow mounting bracket elongated distal surface and slides along the elongated distal surface from said inner end to the outer end when the distal arm assembly moves from said first position to said second position, whereby sliding of the support spring proximal end along the elongated distal surface allows the distal arm assembly to move smoothly and easily into substantially any position between said first position and said second position with little arm backlash.

2. A vision aid system as in claim 1, wherein the elbow mounting bracket comprises a elbow extension having a curved upper edge and an upwardly-extending protrusion, wherein the curved upper edge is said elongated distal surface along which the support spring slides and wherein the protrusion upends from the outer end of the elongated distal surface and prevents the support spring proximal end from sliding off of the elbow mounting bracket.

3. A vision aid system as in claim 2, wherein the elbow mounting bracket comprises a first end to which the proximal arm assembly is pivotally attached, a second end opposite the first end which is the elbow extension, and a central area between said first end and second of the elbow mounting bracket to which the distal arm assembly is pivotally attached.

4. A vision aid system as in claim 1, wherein said camera mount assembly comprises a gooseneck tube for fine adjustment of the camera location relative to the second end of the distal arm assembly.

5. A vision aid system as in claim 4, further comprising a base assembly connected to the proximal arm assembly first end for connection to a horizontal surface, wherein the camera mount assembly includes a camera mounting bracket connecting the gooseneck tube to the distal arm assembly and having a vertical axis, and wherein the gooseneck swivels in a horizontal plane about 270° on the vertical axis.

6. A vision aid system as in claim 1, further comprising a base assembly connected to the proximal arm assembly first end for connection to a horizontal surface, and wherein said proximal arm assembly comprises:

an upper proximal arm tube having a bottom surface;

a lower proximal arm tube having an upper surface;

a proximal suspension spring extending from the lower proximal arm tube to the base assembly for supporting the proximal arm assembly; and an inner compression spring extending between and contacting the upper surface of the lower proximal arm tube and the bottom surface of the upper proximal arm tube.

7. A vision aid system as in claim 6, wherein the inner compression spring is attached to said upper surface and contacts but is not attached to said bottom surface.

8. A vision aid system as in claim 1, further comprising a mirror connected to the camera near and at an angle to a lense of the camera.

* * * * *